United States Patent [19]

Varvil et al.

[11] Patent Number: 4,491,597

[45] Date of Patent: Jan. 1, 1985

[54] CANDY BAR

[75] Inventors: R. Douglas Varvil, Decatur, Ill.; Lon L. Wilson, Brunswick, Ohio; Joseph W. Bell, Robinson, Ill.

[73] Assignee: SCM Corporation, New York, N.Y.

[21] Appl. No.: 433,675

[22] Filed: Oct. 12, 1982

Related U.S. Application Data

[63] Continuation-in-part of Ser. No. 228,281, Jan. 26, 1981, abandoned.

[51] Int. Cl.³ ............................................. A23G 3/00
[52] U.S. Cl. .................................... 426/103; 426/660; 426/810; 426/306
[58] Field of Search ................ 426/660, 103, 810, 306

[56] References Cited

U.S. PATENT DOCUMENTS

| | | | |
|---|---|---|---|
| 152,019 | 6/1874 | Smith | 426/660 |
| 1,111,917 | 9/1914 | Odegard | 426/660 |
| 1,255,638 | 2/1918 | Reed | 426/660 |
| 1,482,473 | 2/1964 | Lord et al. | 426/295 |
| 1,614,057 | 1/1927 | Belcher | 426/660 |
| 1,949,835 | 3/1934 | James et al. | 426/289 |
| 2,082,312 | 6/1937 | Todd | 426/660 |
| 2,967,493 | 1/1961 | Cloud et al. | 426/295 |
| 3,431,112 | 3/1969 | Durst | 426/810 |
| 3,486,904 | 12/1969 | Ziegler | 426/438 |
| 4,117,176 | 9/1978 | Taylor et al. | 426/660 |
| 4,120,987 | 10/1978 | Moore | 426/660 |
| 4,234,618 | 11/1980 | Jasko et al. | 426/660 |
| 4,278,700 | 7/1981 | Barents et al. | 426/660 |
| 4,307,126 | 12/1981 | Sano | 426/660 |

*Primary Examiner*—Jeanette M. Hunter
*Attorney, Agent, or Firm*—Richard H. Thomas

[57] ABSTRACT

A candy bar comprising tortilla chips distributed in or on an edible candy matrix.

17 Claims, No Drawings

CANDY BAR

This is a continuation-in-part application of U.S. Ser. No. 228,281, filed Jan. 26, 1981, now abandoned.

TECHNICAL FIELD

This invention relates to a novel candy bar.

BACKGROUND ART

Popular candy bars are compounded from sweeteners, proteinaceous matter, lipids, emulsifiers, natural and artificial flavors and colorants, often chocolate or cocoa, and gums. Frequently they contain nut pieces, fruit such as raisins, and rigidly foamed cereal granules. Many of them are enrobed with a chocolate-like or pastel candy coating; sometimes they are glazed. Each has desirable organoleptic properties.

The instant candy bar introduces to this trade pleasing new organoleptic sensations. These probably are due to the geometry, crispness/tenderness properties, and taste contrast (relative to the sweet matrix) of an essential ingredient, namely, corn chips.

SUMMARY OF THE INVENTION

The novel candy bar of this invention comprises fried corn chips, such as tortilla chips, distributed in an edible candy matrix. These chips can be salted or otherwise flavored on the surface (barbecue, cheese, or the like), if desired. The chips are generally fairly thin and broad, and are made by frying a paste made preponderantly from maize.

DESCRIPTION OF THE PREFERRED EMBODIMENTS

In the simplest embodiment, the chips are dispersed in a molten candy matrix such as sweet chocolate, the mixture then cast into a mold and cooled. Alternatively, the matrix can comprise or consist of caramel, nougat, fudge, fondant, gum confection, marshmallow, toffee, praline, or other conventional candy formulation. The corn chips can be distributed throughout the bar or be in a particular layer or be studded about a core. The matrix can be enrobed, typically in a chocolate or cocoa-flavored candy enrobing.

Thus, the candy bar can have, for example, the corn chips distributed in a layer of caramel overlying a layer of nougat with the resulting laminate enrobed in chocolate, or studded around a core of chewy nougat with the thus-studded core enrobed, or distributed in a toffee which can be enrobed in chocolate, or otherwise distributed in one or more fractions of the resulting candy bar. If it is desired to render the chip resistant to water or the like in the processing, the chip can be lightly coated with an edible triglyceride fat such as a confectioner's hard butter.

Typical useful sweeteners in fabrication of the bar include sugar (sucrose), corn syrup (liquid or solid), invert sugar such as dextrose, sorbitol, and the like. Typical proteinaceous material includes whole eggs or egg fractions, whole milk, skim milk, sweetened condensed milk, milk solids, soya protein, soy flour, and whey. Typical fats used include hydrogenated vegetable oil derived from, for example, palm kernel oil, coconut oil, soybean oil, palm oil, cottonseed oil, corn oil, and safflower oil. Frequently these are special fat fractions useful as confectioner's hard butters. Also useful are cocoa butter, cocoa solids which generally contain a small lipid fraction, chocolate liquor, Dutch chocolate, milk chocolate, or various of the other eating chocolate compositions.

The matrix usually is flavored and colored with natural and artificial flavors and colorants such as vanillin, salt (NaCl), and beta carotene, may contain a buffer such as dipotassium phosphate and one or more vitamins. Typical emulsifiers used are lecithin such as soya lecithin and mono- and diglycerides. Gum colloid stabilizers such as carrageenan or calcium carrageenan, guar gum, locust bean gum, or xanthomonas gum often are used in small proportion. Raisins, nuts, and/or rigidly foamed cereal granules can be incorporated into the matrix also, along with the corn chips.

The lipids used in the candy bar desirably have bland flavor, and frequently it is essential that they approximate cocoa butter in their melting properties for best mouthfeel. The corn chips generally are about 1/16 inch thick. In full size, they often are curled rectangles about ½ to ¾ inch wide by about 1½ to 2 inches long. They usually are broken to provide much smaller pieces, e.g. half to a quarter the size of one's little fingernail, but can be used full size (rectangles, triangles, etc.) or in variously-shaped smaller pieces. They are present to at least some threshold of flavor or textural effect throughout the bar or in one or more loci or layers, advantageously at least about 5% by weight and preferably about 8-20%. Lesser proportions of strong flavored chips clearly can be used, as can much greater proportions, so long as desired cohesiveness is maintained for handling, e.g. 80-95%. Corn chips, of course, are to be distinguished from conventional cereal corn flakes by their taste, texture, and method of manufacture. For instance, corn flakes are not fried but rather are roasted or toasted.

The examples are illustrative only. All parts herein are parts by weight, all percentages weight percentages, and all temperatures in degrees F., unless otherwise expressly indicated.

EXAMPLE 1

A matrix of a candy bar is made following the procedure set forth in detail in Example 3, except that the tortilla chips are fried in a hard butter rather than the liquid oil or fat conventionally employed in frying corn chips.

Corn chips fried in an oil which is liquid or semi-liquid at room temperature, normally will contain more than about 20% by weight oil, for instance, 30-34% oil. When these chips are placed in a chocolate-type candy bar, the liquid oil from the chips has a tendency to migrate over time from the chip to the hard butter, in ordinary storage, softening the hard butter. Storage normally is at about 75° F., but may cycle to temperatures as high as 90° F., making such migration possible. In addition, fat bloom can occur from the migration. This is the phenomenon where fat crystals transform to a liquid phase, causing a fracturing to occur at the surface of the coating and the development of discontinuous light, gray spots, or speckling.

In this example, the softening and bloom is prevented by frying the corn chips in the same hard butter or a similar hard butter as used in the confection coating. A "same hard butter" or "similar" hard butter is one that has about the same fatty acid composition and melting point as the confection hard butter. For instance, if the confection hard butter is a lauric fat of a particular melting point, then a lauric fat of about the same melting point is preferred. Similarly, if a non-lauric fat is employed in the confection coating, a non-lauric fat is preferred in the frying step.

For the purposes of the present application, a hard butter is defined as a triglyceride material having special properties and performance qualities. The principal physical properties considered in a hard butter are softening point, melting point, and fracture quality. Suitable hard butters should have a Wiley Melting Point between about 84° F. and 120° F., should be hard and brittle at around normal room temperature; that is, they should break sharply and suddenly at about 75° F., thereby having a brittle quality sometimes referred to as "snap". They should also be capable of standing at temperatures encountered in normal summer conditions, without having liquid glyceride components sweat or bleed out to the surface in the form of droplets, or a visible film (bloom).

Of the numerous performance qualities of a hard butter, an important desirable quality is the freedom from a "waxy" feeling or aftertaste in the mouth which is related somewhat but not entirely to a narrow or sharp melting range. Other performance qualities are gauged largely by the performance of standard coatings made with the hard butter. Coatings containing desirable hard butters should set or solidify within a few minutes under normal conditions encountered in the commercial practice of enrobing or otherwise applying the coating to a candy center or food product which is to be coated. The coated product emerging from the cooling tunnel should be firm enough to permit it to be packaged. Another important performance quality is the ability of the coating and the hard butter therein, on the enrobed product, to resist any appreciable change in appearance or character when exposed to normal summer temperatures (e.g., up to 90° F.) or at temperatures which are apt to be encountered in the transportation of the coated products.

Lauric hard butters which are suitable are prepared primarily from lauric oils such as palm kernel, coconut, tucum, babassu, etc., utilizing a variety of processes such as pressing, rearrangement, replacement, interesterification, esterification, blending and solvent fractionation. The resultant hard butters are triglycerides of aliphatic carboxylic acids containing between 8 and 18 carbon atoms and predominantly contain 12 carbon atoms.

Suitable hard butters commonly referred to in the art as "domestic hard butters" are non-random triglyceride hard butters which are obtained by the solvent fractionation of hydrogenated soybean, cottonseed, peanut, rapeseed and corn oils. Domestic hard butters and processes for preparing them are described in U.S. Pat. No. 2,972,541. Domestic hard butters contain predominantly $C_{16}$, $C_{18}$ carbon chain fatty acids.

One particular lauric hard butter useful for frying the corn chips, and also useful in confectionery compositions, is Satina II NT (trademark SCM Corporation), a partially hydrogenated solvent fractionated fat derived from palm kernel oil. This hard butter has a Wiley Melting Point in the range of 95°–97° F., as determined by AOCS method Cc 2-38, and an approximate solid fat index, as determined by AOCS method Cd 10-57, of:

| Temperature °F. | Approx. Solid Fat Index |
| --- | --- |
| 50 | 72–74 |
| 70 | 65–69 |
| 80 | 52–59 |
| 92 | 2 max. |
| 100 | 5 max. |

The hard butter is designed for use in pastel or chocolate flavored coatings and requires little or no tempering following application to a center. It provides properties which are similar to chocolate in shrink, set-up, snap, and edibility.

Another lauric hard butter is Paramount (trademark SCM Corporation), having a Wiley Melting Point in the range of 93°–119° F. and a solid fat index of:

| Temperature °F. | Approx. Solid Fat Index |
| --- | --- |
| 50 | 66–68 |
| 70 | 53–58 |
| 80 | 38–52 |
| 92 | 9–30 |
| 100 | 1–19 |
| 110 | 0–12 max. |

The Paramount hard butters are marketed with 0.4% lecithin.

A non-lauric hard butter with which the present invention is useful is Kaomel (trademark SCM Corporation), having a Wiley Melting Point in the range of about 97°–101° F., an IV of about 59, and a solid fat index as follows:

| Temperature °F. | Approx. Solid Fat Index |
| --- | --- |
| 50 | 69 min. |
| 70 | 59 min. |
| 100 | 5 max. |
| 110 | 0 |

This hard butter is derived by solvent fractionation and hydrogenation from soybean and cottonseed oil, and is described in U.S. Pat. No. 2,972,541 by Cochrane et al, assigned to the assignee of the present invention.

In this example, conventional procedures and apparatus are employed in the frying step, using a hard butter. Such conventional frying temperatures are well above the hard butter melting points. Use of such hard butters for frying prevents the adverse effects referred to above from oil migration into the confectionery coating. This aspect of the invention is applicable to any confectionery hard butter-containing coating, or matrix, including chocolate-containing coatings and matrices.

EXAMPLE 2

In this example, the fried chips are deoiled or partially deoiled prior to being placed in a chocolate-type or confectionery coating or matrix, the amount of deoiling being an effective amount sufficient to prevent the adverse effects of fat migration, such as bloom.

The deoiling or partial deoiling can be carried out by any of a number of known procedures. A preferred procedure is supercritical fluid extraction described in *Chemical and Engineering News* dated Aug. 3, 1982, pages 16 and 17; and also in *Perfumes and Flavorist,* Vol. 6, August/September, 1981, pages 43–55. The disclosures of these publications are incorporated herein by reference.

The process is based on the properties of certain substances at temperatures and pressures above critical temperature and pressure.

Critical temperature is that temperature above which it is impossible to liquify a substance no matter what pressure is applied. For this reason, the process is also referred to as dense gas extraction.

In this process, a preferred solvent is carbon dioxide, heated to a temperature above its critical temperature of 31.1° C. and pressurized above its critical pressure of 32.2 atm. absolute. The solubility of triglycerides in carbon dioxide increases rapidly above 60° C. and 8000 psi.

The components for supercritical extraction include an extraction vessel, a pressure reduction valve, a separator, and a compressor for recycling solvent. One can also use heat exchangers for heat recovery, and other conventional ancillary equipment. In the process, the chips and solvent are fed to the extraction vessel maintained at solvent extracting conditions. The solvent and entrained triglycerides are then reduced in pressure with precipitation out of the triglycerides in the separator. The cycle is completed by repressurizing the solvent and feeding it back to the extraction vessel, with fresh chips.

Advantages with the use of carbon dioxide are that it is inexpensive, and its critical temperature is low so that there is no thermal damage to the chips. Also, there is no toxicity from the use of carbon dioxide such as could be experienced with trade hydrocarbon of more conventional solvent extraction processes.

Also, a critical aspect of the present invention resides in the use of fried corn chips, which alone offers the unique texture, flavor and organoleptic sensation characterizing the present invention. Deoiling or partially deoiling chips under supercritical conditions, with carbon dioxide, subsequent to frying is not likely to adversely detract from this sensation. As long as the chips are prepared by or subjected to the frying step, as compared to baking or toasting, the organoleptic sensation can be obtained even if deoiling or partial deoiling subsequently takes place.

For purposes of the present application, the term "corn chip" means those chips which are fairly thin and broad, and are made by frying a paste made preponderantly from maize. A type of corn chip is one known as a tortilla chip.

EXAMPLE 3

The matrix of a candy bar is made by blending in weight parts 49.45 granulated sugar, 14 molten chocolate liquor, 16 whole milk powder, 20 molten hard butter*, and 0.1 salt, passing this mixture through a three-roll refiner, then conching overnight at 60° C. in a Hobart mixer having planetary motion. Then there is added with further mixing, 0.05 part methyl vanillin and 0.4 part lecithin.

*A partially hydrogenated vegetable fat made from selectively hydrogenated cottonseed oil, said product having a Mettler Dropping Point of 27.8° C., Iodine Value of 55.0 and provided in solid pack.

To the resulting untempered mass is added 15 parts of FRITOS brand tortilla chips, FRITOS being a registered trademark of Frito-Lay, Inc. Dallas, Tex. These chips are broken to pass a No. 4 (U.S.S.) sieve and be retained on a No. 8, and are about a half to a quarter the size of one's little fingernail. A fairly even dispersion results with stirring, and the dispersion is cast into a mold. The mold then is cooled for 70 minutes in a cabinet maintained at 45°–50° F. The chocolate candy bar then is removed from the mold and kept covered until it equilibrates with room temperature, about 70° F. At this point, the candy bar is ready to eat or package.

EXAMPLE 4

A mixture of:

| | |
|---|---|
| Granulated sugar | 35 pounds |
| Corn syrup | 65 pounds |
| Butter-flavored plastic fat derived from coconut oil** | 3 pounds |
| Butter-flavored plastic fat derived from domestic vegetable oil*** | 2 pounds | is cooked to force crack, then an 18-pound increment of sweetened whole condensed milk is blended in and the mixture recooked to force crack; this milk addition and cooking is repeated, then a final addition of 18 pounds of such milk is made, and the resulting mixture is cooked to medium ball. At this point, 8 ounces of salt, 4 ounces of vanilla flavor, and 1 ounce of butterscotch flavor are blended in, and the resulting caramel product is cooled.

The resulting caramel can be formed into a log and studded with broken, salted corn chips of about half fingernail size (FRITOS brand, a registered trademark of Frito-Lay, Inc., Dallas, Tex.), then enrobed in the following milk compound chocolate enrobing composition held at 105°–110° F.:

| | Weight Parts |
|---|---|
| Hard butter* | 22.5 |
| Chocolate liquor | 11 |
| Cocoa powder (12% cocoa butter) | 4.5 |
| Dry skim milk | 12 |
| Granulated sugar | 50 |
| Lecithin | 0.4 |

The thus-enrobed core is cooled in a chocolate candy cooling tunnel and stored at room temperature.

EXAMPLE 5

A nougat matrix is formulated by heating and mixing the following:

| | |
|---|---|
| Granulated sugar | 54 pounds |
| Corn syrup | 36 pounds |
| Water | 6 quarts |

This mixture is cooked to 240° F. and to it is added, with whipping aeration, 2 pounds of dried egg albumen dissolved in 2 quarts of water. To the resulting light, fluffy mixture is then blended in 6 pounds of confectioner's powdered sugar and 2 pounds of the partially hydrogenated coconut oil shortening like that shown in Example 4.

While this mixture is plastic, there is folded in the same kind of tortilla corn chips as shown in Example 4, and the resulting nougat is formed into small slabs.

These slabs can be enrobed, for example, in a dark, sweet compound, chocolate enrobing compounded by melting and mixing the following:

| | Weight Parts |
|---|---|
| Flaked, partially hydrogenated | 22.5 |

|                                               | Weight Parts |
| --------------------------------------------- | ------------ |
| confectioner's hard butter like that shown in Example 2 | |
| Chocolate liquor                              | 8.5          |
| Cocoa powder                                  | 16.          |
| Granulated sugar                              | 53.          |
| Lecithin                                      | 0.4          |

The chocolate liquor, like that of Example 4, is 55% by weight cocoa butter, and the cocoa powder, like that of Example 4, contains 12% cocoa butter. The enrobing advantageously is done with the enrobing compound at about 105°–110° F.

EXAMPLE 6

A matrix of a candy bar is made following the procedure of Example 3, except that the tortilla chips are fried in a hard butter rather than the liquid oil or fat conventionally employed in frying corn chips.

Corn chips fried in an oil which is liquid or semi-liquid at room temperature, normally will contain more than about 20% by weight oil, for instance, 30–34% oil. When these chips are placed in a chocolate-type candy bar, the liquid oil from the chips has a tendency to migrate over time from the chip to the hard butter, in ordinary storage, softening the hard butter. Storage normally is at about 75° F., but may cycle to temperatures as high as 90° F., making such migration possible. In addition, fat bloom can occur from the migration. This is the phenomenon where fat chrystals transform to a liquid phase, causing a fracturing to occur at the surface of the coating and the development of discontinuous light, gray spots, or speckling.

In this example, the softening and bloom is prevented by frying the corn chips in the same hard butter or a similar hard butter as used in the confection coating. A "same hard butter" or "similar" hard butter is one that has about the same fatty acid composition and melting point as the confection hard butter. For instance, if the confection hard butter is a lauric fat of a particular melting point, then a lauric fat of about the same melting point is preferred. Similarly, if a non-lauric fat is employed in the confection coating, a non-lauric fat is preferred in the frying step.

For the purposes of the present application, a hard butter is defined as a triglyceride material having special physical properties and performance qualities. The principal physical properties considered in a hard butter are softening point, melting point, and fracture quality. Suitable hard butters should have a Wiley Melting Point between about 84° F. and 120° F., should be hard and brittle at around normal room temperature; that is, they should break sharply and suddenly at about 75° F., thereby having a brittle quality sometimes referred to as "snap". They should also be capable of standing at temperatures encountered in normal summer conditions, without having liquid glyceride components sweat or bleed out to the surface in the form of droplets, or a visible film (bloom).

Of the numerous performance qualities of a hard butter, an important desirable quality is the freedom from a "waxy" feeling or aftertaste in the mouth which is related somewhat but not entirely to a narrow or sharp melting range. Other performance qualities are gauged largely by the performance of standard coatings made with the hard butter. Coatings containing desirable hard butters should set or solidify within a few minutes under normal conditions encountered in the commercial practice of enrobing or otherwise applying the coating to a candy center or food product which is to be coated. The coated product emerging from the cooling tunnel should be firm enough to permit it to be packaged. Another important performance quality is the ability of the coating and the hard butter therein, on the enrobed product, to resist any appreciable change in appearance or character when exposed to normal summer temperatures (e.g., up to 90° F.) or at temperatures which are apt to be encountered in the transportation of the coated products.

Lauric hard butters which are suitable are prepared primarily from lauric oils such as palm kernel, coconut, tucum, babassu, etc., utilizing a variety of processes such as pressing, rearrangement, replacement, interesterification, esterification, blending and solvent fractionation. The resultant hard butters are triglycerides of aliphatic carboxylic acids containing between 8 and 18 carbon atoms and predominantly contain 12 carbon atoms.

Suitable hard butters commonly referred to in the art as "domestic hard butters" are non-random triglyceride hard butters which are obtained by the solvent fractionation of hydrogenated soybean, cottonseed, peanut, rapeseed and corn oils. Domestic hard butters and processes for preparing them are described in U.S. Pat. No. 2,972,541. Domestic hard butters contain predominantly $C_{16}$, $C_{18}$ carbon chain fatty acids.

One particular lauric hard butter useful for frying the corn chips, and also useful in confectionery compositions, is Satina II NT (trademark SCM Corporation), a partially hydrogenated solvent fractionated fat derived from palm kernel oil. This hard butter has a Wiley Melting Point in the range of 95°–97° F., as determined by AOCS method Cc 2-38, and an approximate solid fat index, as determined by AOCS method Cd 10-57, of

| Temperature °F. | Approx. Solid Fat Index |
| --------------- | ----------------------- |
| 50              | 72–74                   |
| 70              | 65–69                   |
| 80              | 52–59                   |
| 92              | 2 max.                  |
| 100             | 5 max.                  |

The hard butter is designed for use in pastel or chocolate flavored coatings and requires little or no tempering following application to a center. It provides properties which are similar to chocolate in shrink, set-up, snap, and edibility.

Another lauric hard butter is Paramount (trademark SCM Corporation), having a Wiley Melting Point in the range of 93°–119° F. and a solid fat index of:

| Temperature °F. | Approx. Solid Fat Index |
| --------------- | ----------------------- |
| 50              | 66–68                   |
| 70              | 53–58                   |
| 80              | 38–52                   |
| 92              | 9–30                    |
| 100             | 1–19                    |
| 110             | 0–12 max.               |

The Paramount hard butters are marketed with 0.4% lecithin.

A non-lauric hard butter with which the present invention is useful is Kaomel (trademark SCM Corporation), having a Wiley Melting Point in the range of about 97°–101° F., an IV of about 59, and a solid fat index as follows:

| Temperature °F. | Approx. Solid Fat Index |
|---|---|
| 50 | 69 min. |
| 70 | 59 min. |
| 100 | 5 max. |
| 110 | 0 |

This hard butter is derived by solvent fractionation and hydrogenation from soybean and cottonseed oil, and is described in U.S. Pat. No. 2,972,541 by Cochrane et al, assigned to assignee of the present invention.

In this Example, conventional procedures and apparatus are employed in the frying step, using a hard butter. Such conventional frying temperatures are well above the hard butter melting points. Use of such hard butters for frying prevents the adverse affects referred to above from oil migration into the confectionery coating. This aspect of the invention is applicable to any confectionery hard butter-containing coating, or matrix, including chocolate-containing coatings and matrices.

EXAMPLE 7

In this Example, the fried chips are deoiled or partially deoiled prior to being placed in a chocolate-type or confectionery coating or matrix, the amount of deoiling being an effective amount sufficient to prevent the adverse affects of fat migration, such as bloom.

The deoiling or partial deoiling can be carried out by any of a number of known procedures. A preferred procedure is supercritical fluid extraction described in Chemical & Engineering News dated August 3, 1982, pages 16 and 17; and also in Perfumes and Flavorist, Vol. 6, August/September, 1981, pages 43–55. The disclosures of these publications are incorporated herein by reference.

The process is based on the properties of certain substances at temperatures and pressures above critical temperature and pressure.

Critical Temperature is that temperature above which it is impossible to liquify a substance no matter what pressure is applied. For this reason, the process is also referred to as dense gas extraction.

In this process, a preferred solvent is carbon dioxide, heated to a temperature above its critical temperature of 31.1° C. and pressurized above its critical pressure of 32.2 atm. absolute. The solubility of triglycerides in carbon dioxide increases rapidly above 60° C. and 8000 psi.

The components for supercritical extraction include an extraction vessel, a pressure reduction valve, a separator, and a compressor for recycling solvent. One can also use heat exchangers for heat recovery, and other conventional ancillary equipment. In the process, the chips and solvent are fed to the extraction vessel maintained at solvent extracting conditions. The solvent and entrained triglycerides are then reduced in pressure with precipitation out of the triglycerides in the separator. The cycle is completed by repressurizing the solvent and feeding it back to the extraction vessel, with fresh chips.

Advantages with the use of carbon dioxide are that it is inexpensive, and its critical temperature is low so that there is no thermal damage to the chips. Also, there is no toxicity from the use of carbon dioxide such as could be experienced with trade hydrocarbon of more conventional solvent extraction processes.

Also, a critical aspect of the present invention resides in the use of fried corn chips, which alone offers the unique texture, flavor and organoleptic sensation characterizing the present invention. Deoiling or partially deoiling chips under supercritical conditions, with carbon dioxide, subsequent to frying is not likely to adversely detract from this sensation. As long as the chips are prepared by or subjected to the frying step, as compared to baking or toasting, the organoleptic sensation can be obtained even if deoiling or partial deoiling subsequently takes place.

For purposes of the present application, the term "corn chip" means those chips which are fairly thin and broad, and are made by frying a paste made preponderantly from maize. A type of corn chip is one known as a tortilla chip.

We claim:

1. A candy bar comprising:
   an edible candy matrix; and
   about 5–95% fried corn chips, based on the candy bar weight, distributed in or on said edible candy matrix, the size of said fried chips being effective to provide chip mouthfeel;
   said candy matrix containing a hard butter having a Wiley Melting Point between about 84° F.–120° F.; and
   said corn chips being selected from the group consisting of:
      corn chips which are at least partially deoiled following frying, the amount of deoiling being an effective amount sufficient to prevent migration of oil from said corn chips to said hard butter in said candy matrix and softening of said hard butter and to prevent fat bloom in said candy matrix and fracturing at the surface of said candy bar, and
      corn chips having as a fat content a hard butter compatible with and having about the same fatty acid composition and melting point as said hard butter contained in said candy matrix to prevent softening of said hard butter contained in said candy matrix and fracturing at the surface of said candy bar.

2. The candy bar of claim 1 wherein said chips are salted.

3. The candy bar of claim 1 wherein said matrix is sweet chocolate.

4. The candy bar of claim 1 wherein said matrix is a fudge.

5. The candy bar of claim 1 wherein said matrix comprises carmel.

6. The candy bar of claim 1 wherein said matrix comprises nougat.

7. The candy bar of claim 1 wherein said matrix comprises fondant.

8. The candy bar of claim 1 wherein said matrix comprises gum.

9. The candy bar of claim 1 wherein said matrix comprises marshmallow.

10. The candy bar of claim 1 wherein said matrix is praline.

11. The candy bar of claim 1 wherein said matrix is toffee.

12. The candy bar of claim 1 wherein said matrix is enrobed.

13. A candy bar comprising:

an edible candy matrix; and about 5-95% fried corn chips, based on the candy bar weight, distributed in or on said edible candy matrix, the size of said fried chips being effective to provide chip mouthfeel;

said candy matrix containing a hard butter having a Wiley Melting Point between about 84° F.–120° F.; and said corn chips having a fat content of at least about 20% by weight, the fat being a hard butter compatible with and having about the same fatty acid composition and melting point as said hard butter contained in said candy matrix to prevent softening of said hard butter contained in said candy matrix and fracturing at the surface of said candy bar.

14. A candy bar comprising:

an edible candy matrix; and about 5-95% fried corn chips, based on the candy bar weight, distributed in or on said edible candy matrix, the size of said fried chips being effective to provide chip mouthfeel;

said candy matrix containing a hard butter having a Wiley Melting Point between about 84° F.–120° F.; and said corn chips being at least partially deoiled following frying, the amount of deoiling being an effective amount sufficient to prevent migration of oil from said corn chips to said hard butter in said candy matrix and softening of said hard butter and to prevent fat bloom in said candy matrix and fracturing at the surface of said candy bar.

15. A method for making candy bars comprising:

incorporating into or on a candy matrix about 5-95% fried corn chips, based on the candy bar weight, the size of said chips being effective to provide chip mouthfeel;

said candy matrix containing a hard butter having a Wiley Melting Point between about 84° F.–120° F.; and said corn chips being at least partially deoiled following frying, the amount of deoiling being an effective amount sufficient to prevent migration of oil from said corn chips to said hard butter in said candy matrix and softening of said hard butter and to prevent fat bloom in said candy matrix and fracturing at the surface of said candy bar.

16. The method of claim 15 wherein the chips are deoiled by supercritical fluid extraction using carbon dioxide solvent.

17. A method for making candy bars comprising:

incorporating into or on a candy matrix about 5-95% fried corn chips, based on the candy bar weight, the size of said chips being effective to provide mouthfeel;

said candy matrix containing a hard butter having a Wiley Melting Point between about 84° F.–120° F.; and said corn chips being fried in a hard butter compatible with and having about the same fatty acid composition and melting point as said hard butter contained in said candy matrix to prevent softening of said hard butter contained in said candy matrix and fracturing at the surface of said candy bar.

* * * * *